United States Patent [19]

Imai et al.

[11] Patent Number: 4,760,123
[45] Date of Patent: Jul. 26, 1988

[54] ROOM TEMPERATURE CURING POLYORGANOSILOXANE COMPOSITIONS

[75] Inventors: Takafumi Imai; Fumihiko Kobayashi, both of Ohta, Japan

[73] Assignee: Toshiba Silicone Co., Ltd, Japan

[21] Appl. No.: 905,605

[22] Filed: Sep. 9, 1986

[30] Foreign Application Priority Data

Sep. 11, 1985 [JP] Japan .................. 60-201405

[51] Int. Cl.$^4$ .................. C08G 77/06
[52] U.S. Cl. .................. 528/18; 528/15; 528/19; 528/33; 528/34; 528/38; 525/477
[58] Field of Search .......... 528/33, 38, 34, 15, 528/18, 19; 525/477

[56] References Cited

U.S. PATENT DOCUMENTS

| | | | |
|---|---|---|---|
| 3,686,357 | 8/1972 | Cheeseman | 528/33 |
| 4,537,944 | 8/1985 | Imai | 528/19 |
| 4,618,646 | 9/1986 | Takago | 528/33 |

FOREIGN PATENT DOCUMENTS

| | | | |
|---|---|---|---|
| 1199659 | 7/1970 | United Kingdom | 528/38 |
| 1363069 | 8/1974 | United Kingdom | 525/477 |
| 1435636 | 5/1976 | United Kingdom | 525/477 |

*Primary Examiner*—John C. Bleutge
*Assistant Examiner*—David Buttner

[57] ABSTRACT

Room temperature curing polyorganosiloxane compositions comprising:

(A) 100 parts by weight of a composition containing
 (1) a polyorganosiloxane

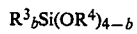

wherein R represents a substituted or unsubstituted monovalent hydrocarbon group; which the viscosity of (A) at 25° C. may be 100 to 500,000 cP,
which is reactive at the terminal groups and
(2) a silane of the formula:

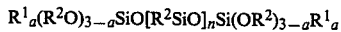

wherein R represents substituted or unsubstituted monovalent hydrocarbon groups; b is a numeral of 0 or 1,
or a hydrolyzate thereof,
wherein (A)(1) is 85 to 100% by weight of the total of (A)(1) and (A)(2);
(B) 0.01 to 10 parts by weight of a curing catalyst;
(C) 0.5 to 10 parts by weight of a nitrogen containing silicon compound, wherein a nitrogen atom is bonded to a silicon atom via one or more carbon atoms and the nitrogen atom is also bonded directly to the same silicon atom or another silicon atom; and
(D) 0.05 to 50 parts by weight of a polyorganosiloxane expressed by the formula:

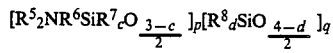

wherein $R^5$ may be the same or different and each represents a monovalent group selected from the group consisting of a hydrogen atom, and substituted or unsubstituted hydrocarbon groups; $R^6$ represents a divalent hydrocarbon group; $R^7$ and $R^8$ may be the same or different and each represents a substituted or unsubstituted monovalent hydrocarbon group; the viscosity of (D) at 25° C. may be 5 to 10,000 cP and $p/(p+q)$ is 0.33 or less, which may also contain amounts of residual hydroxyl groups or alkoxy groups bonded to silicon atoms.

26 Claims, No Drawings

ROOM TEMPERATURE CURING POLYORGANOSILOXANE COMPOSITIONS

The present application claims priority of Japanese patent application Ser. No. 60-201405 (1985) filed Sept. 11, 1985.

BACKGROUND OF THE INVENTION

The present invention relates to polyorganosiloxane compositions, particularly to polyorganosiloxane compositions which are stable under a sealed condition but cure to an elastomer at room temperature through contact with moisture contained in air.

Polyorganosiloxane compositions which cure to an elastomer at room temperature may be employed in a variety of uses. Generally, these polyorganosiloxanes are of the one-component type wherein a curing reaction is effected through contact with the moisture contained in air. The uses for such polyorganosiloxanes include elastomeric adhesives, coating materials in the electric and electronic industries and also as a sealing material for buildings, etc. One-component polyorganosiloxanes do not require troublesome procedures before using, for example, weighing out the main component, crosslinking agent and catalyst as well as mixing thereof, whereby the mistakes are avoided which may be caused during such procedures.

Room temperature curable polyorganosiloxane compositions generally comprise a polydiorganosiloxane having terminal silanol groups which is mixed with a crosslinking agent etc. having an average of more than two hydrolytic groups in a molecule. Upon cure, the compositions release acetic acid, long chain carboxylic acids, organic amines, amides, organic hydroxylamines, oxime compounds, alcohols, acetone or the like depending on the kind of crosslinking agent.

Among these compositions, those which release acetic acid have excellent adhesiveness and curing property. However, they are disadvantageous in that they emit irritating odor, requiring countermeasures for protecting environmental health. Further, in the case where the substrate to be coated is metal, they rust the metal, requiring countermeasures for preventing rusting, etc. Those compositions which release long-chain carboxylic acids have no problem of developing irritating odor but in such compositions it has been difficult to prevent rusting of metals, particularly after the metals have been immersed in water. Similarly, those which release amines have disadvantages in the odor and toxicity of the amines which are released therefrom and those which release hydroxylamines, oximes or amides have disadvantages that they rust metal easily, especially copper and its alloys. Further, while those which release acetone cure rapidly and are free from corrosiveness, they have disadvantages in that synthesis of the crosslinking agent is difficult and the uncured composition yellows upon storage.

In contrast to the above compositions, those which release alcohols have advantages that alkoxysilanes as cross-linking agents are available at low cost. Also, they are free from odor and corrosiveness since by-products released therefrom are easily volatilized alcohols such as methanol or ethanol. On the other hand, however, they have disadvantages that they cure slowly and that they have poor storage stability. Where water impurities are present, the base polymer is cleaved by the alcohol released as a result of hydrolysis of the crosslinking agent.

Especially in electric and electronic industries, room temperature curing polyorgano-siloxane compositions are frequently cured in a state in contact with copper series metals to form rubber-like elastomers and are used as adhesives, coating materials, etc. Accordingly, oxime releasing compositions, acetone releasing compositions and alcohol releasing compositions have conventionally been used, but improvement of the disadvantages as mentioned above have been desired.

It has recently been found that a one-component type room temperature curing polyorganosiloxane composition comprising a polyorganosiloxane having terminal silicon atoms bonded to alkoxy groups, an alkoxysilane, a curing catalyst and an alcohol scavenger, has excellent storage stability and cures rapidly (refer to Japanese Provisional Patent Publication Nos. 59-500219 (1984) and 58-501040 (1983)). It has also been found that if a compound containing silicon-nitrogen bonds is used as the alcohol scavenger, a nonvolatile nitrogen containing compound is formed through reaction with an alcohol and the resulting composition does not exhibit corrosiveness to copper series metals.

While such room temperature curable polyorganosiloxane compositions which cure rapidly and do not rust copper series metals are useful as adhesives or as coating materials in the electric and electronic industries, they still exhibit certain problems. The compound containing the silicon-nitrogen bond as an alcohol scavenger is hydrolyzed and the hydrolyzate bleeds to the surface of the cured rubber and resinified, which gives cracks on the surface leading sometimes to low physical properties or low durability of the cured rubber.

The present inventors have previously found that a compound containing a polyoxyalkylene chain in a molecule is effectively used to prevent such resinification and have filed a patent application therefor (Japanese Patent Application No. 58-125649 (1983); Japanese Provisional Patent Publication No. 60-18544 (1985)).

However, a composition obtained according to the above method does not adhere sufficiently to certain plastic substrates to be coated. Namely, it exhibits poor adhesiveness to polycarbonate substrates. Also, there may sometimes not be obtained satisfactory results in terms of adhesiveness to acrylic resin substrates depending on the conditions under which they are employed. For such reasons, the above composition has not been appropriate for uses wherein polycarbonate or acrylic resin is used in spite of its many advantages namely, it is free from corrosiveness to copper series metals, it cures in a relatively short time at room temperature and also is free from bleeding.

SUMMARY OF THE INVENTION

As a result of the present inventors' extensive work, a room temperature curing polyorganosiloxane composition has been obtained which has excellent adhesion to a variety of substrates, including polycarbonate and acrylic resin substrates, without impairing the above-mentioned advantages. They found that bleeding of the surface of a cured rubber-like elastomer may be prevented without lowering adhesion by employing a polyorganosiloxane of specific composition containing substituted or unsubstituted aminoalkyl groups instead of a compound containing polyoxyalkylene chains.

DESCRIPTION OF THE INVENTION

Namely, the present invention relates to room temperature curing polyorganosiloxane composition comprising the following components:

(A) 100 parts by weight of a composition containing
(1) a polyorganosiloxane of the formula:

$$R^1{}_a(R^2O)_{3-a}SiO[R_2SiO]_nSi(OR^2)_{3-a}R^1{}_a$$

wherein R and $R^1$ may be the same or different or unsubstituted monovalent hydrocarbon group; $R^2$ represents a monovalent group selected from the group consisting of an alkyl group having 1 to 4 carbon atoms and an alkoxyalkyl group having 1 to 6 carbon atoms in total; a is a numeral of 0 or 1; and n is a numeral, by which the viscosity of (A) at 25° C. may be 100 to 500,000 cP, which is reactive at the terminal groups and
(2) a silane of the formula:

$$R^3{}_bSi(OR^4)_{4-b}$$

wherein $R^3$ represents a substituted or unsubstituted monovalent hydrocarbon group; $R^4$ represents a monovalent group selected from the group consisting of an alkyl group having 1 to 4 carbon atoms and an alkoxyalkyl group having 1 to 6 carbon atoms in total; b is a numeral of 0 or 1, or a hydrolyzate thereof,
wherein (A)(1) is 85 to 100% by weight of the total of (A)(1) and (A)(2);

(B) 0.01 to 10 parts by weight of a curing catalyst;
(C) 0.5 to 10 parts by weight of a nitrogen containing silicon compound, wherein a nitrogen atom is bonded to a silicon atom via one or more carbon atoms and the nitrogen atom is also bonded directly to the same silicon atom or another silicon atom; and
(D) 0.05 to 50 parts by weight of a polyorganosiloxane containing substituted or unsubstituted aminoalkyl groups, and expressed by the formula:

$$[R^5{}_2NR^6SiR^7{}_cO_{\frac{3-c}{2}}]_p[R^8{}_dSiO_{\frac{4-d}{2}}]_q$$

wherein $R^5$ may be the same or different and each represents a monovalent group selected from the group consisting of a hydrogen atom, substituted and unsubstituted hydrocarbon groups; $R^6$ represents a divalent hydrocarbon group; $R^7$ and $R^8$ may be the same or different and each represents a substituted or unsubstituted monovalent hydrocarbon group; c is a numeral of 0, 1 or 2; d is a numeral of 0 or from 1 to 3; and p and q are numerals of 1 or more, by which the viscosity of (D) at 25° C. may be 5 to 10,000 cP and p/(p+q) is 0.33 or less, which may also contain amounts of residual hydroxyl groups or alkoxy groups bonded to silicon atoms.

(A)(1) is a base polymer for the present composition and is represented by the formula:

$$R^1(R^2O)_{3-a}SiO[R_2Sio]_nSi(OR^2)_{3-a}R^1{}_a$$

wherein R, $R^1$, $R^2$, a and n have the same meanings as defined before.

R may be the same or different and each represents an alkyl group such as methyl, ethyl, propyl, butyl, hexyl or decyl; an alkenyl group such as vinyl or allyl; an aryl group such as phenyl; an aralkyl group such as β-phenylethyl, β-phenylpropyl; or a hydrocarbon group as mentioned above wherein a part of hydrogen atoms is substituted by halogen atom, nitrile group, etc. However, because of ease of synthesis, it is preferred that they are methyl group, vinyl group, phenyl group, etc. There may be used other organic groups as appropriate when a specific property such as oil resistance or coating characteristics is to be imparted to a resulting cured rubber-like elastomer.

It is preferred that 85% or more of the whole organic groups are methyl groups, more preferably all of them are essentially methyl groups, since, when methyl group is used, not only are starting intermediates most easily obtained but the lowest viscosity corresponding to the degree of polymerization of siloxane is exhibited. Further, the handling ability of a composition prior to curing in an extruding process is advantageously balanced with the physical properties of the resulting rubber-like elastomer after completion of curing is attained. However, in the case where low temperature resistance is required to a resulting cured rubber-like elastomer, it is preferred that phenyl group is used as a part of the organic groups.

Next, as $R^1$, there may be mentioned the same organic groups as represented by R. However, because of ease of synthesis and high crosslinking reaction rate, it is preferred that they are methyl group or vinyl group.

$R^2$ of the above formula is exemplified by an alkyl group such as methyl, ethyl, propyl or butyl and an alkoxyalkyl group such as methoxyethyl or ethoxyethyl. However, because of ease of synthesis and high crosslinking reaction rate, etc., it is most preferred that they are a methyl group.

In the present invention, it is also preferred that the polydiorganosiloxane base polymer has a viscosity at 25° C. in the range from 100 to 500,000 cP in order to impart appropriate extrudability to the composition prior to curing, as well as, to impart excellent mechanical properties to the resulting cured rubber-like elastomer. In the case where the viscosity of the polydiorganosiloxane having reactive terminal groups is less than 100 cP, a resulting cured rubber-like elastomer exhibits insufficient elongation; whereas in the case where the viscosity thereof exceeds 500,000 cP, it is difficult to obtain a homogeneous composition and the composition is more difficult to handle in an extrusion operation. Particularly preferred viscosity is in the range from 500 to 200,000 cP so that a favorable balance of the properties of a composition prior to and after curing may be attained.

The silane or partial hydrolytic condensate thereof, (A)(2), acts as a crosslinking agent to effect during through reaction with the alkoxy groups of (A)(1) in the presence of water and a curing catalyst. The silane is represented by the formula $R^3{}_bSi(OR^4)_{4-b}$, wherein $R^3$, $R^4$ and b have the same meanings as defined before.

In the above formula, $R^3$ is represented by the same organic groups bonded directly to the silicon atoms contained in component (A)(1) as represented by R. However, in view of availability and curing speed, it is preferred that they are methyl group or vinyl group. $R^4$ is exemplified by the same groups as represented by $R^2$ contained in component (1).

Such compounds are exemplified by tetramethoxysilane, methyltrimethoxysilane, ethyltrimethoxysilane, vinyltrimethoxysilane, phenyltrimethoxysilane, tetraethoxysilane, methyltriethoxysilane, methyltriisopropoxysilane, phenyl triethoxysilane, tetrakis(ethoxyethoxy)silane, methyltris(methoxyethoxy)silane, vinyltris(methoxyethoxy)silane and siloxanes which are partial hydrolytic condensates of the above silanes.

It is particularly preferred that among the above compounds, tetramethoxysilane, methyltrimethoxysilane, vinyltrimethoxysilane, methyltris(methoxyethoxy)silane, vinyltris(methoxyethoxy)silane, etc. are used in view of ease of synthesis and of the facts that the storage stability of a resulting composition is not impaired and that the curing speed thereof is accelerated.

(A) may comprise base polymer (A)(1) alone, in some cases having crosslinking property itself, or a mixture of (A)(1) and crosslinking agent (A)(2). The appropriate proportion thereof in (A) is in a range such that (A)(1) may be 85 to 100% by weight relative to 0 to 15% by weight of (A)(2). In the case where the amount of (A)(2) exceeds 15% by weight, (A)(2) is not only separated from the composition during storage but notable shrinkage is caused upon curing as well as lower physical properties of a resulting rubber-like elastomer.

In the case where more than two alkoxy groups on an average are bonded to the terminal silicon atoms of the polydiorganosiloxane, (A)(1), the reaction proceeds in the presence of moisture and a curing catalyst without further addition of silane or partial hydrolyzate thereof, (A)(2). However, in view of the balance of curing property and mechanical properties after completion of curing, it is preferred that (A)(2) in (A) is used in an amount of 0.4 to 5% by weight.

Curing catalyst, (B), to be used in the present invention is a catalyst for conducting the reaction of (A)(1) alone or the reaction between (A)(1) and (A)(2) in the presence of moisture to obtain a rubber-like elastomer. The curing catalyst is exemplified by a metal salt of carboxylic acid such as iron octoate, cobalt octoate, manganese octoate, zinc octoate, stannous naphthenate, stannous capriate or stannous oleate, and an organic stannous compound such as dibutyltin diacetate, dibutyltin dioctoate, dibutyltin dilaurate, dibutyltin dioleate, diphenyltin diacetate, dibutyltin oxide, dibutyltin methoxide, dibutylbis(triethoxysiloxy)tin or dioctyltin dilaurate. However, it is preferred that it is an organic stannous compound since it has a high catalytic capability even when it is present in a slight amount. The amount of (B) to be mixed is between 0.01 and 10 parts by weight, preferably 0.1 and 1 part by weight. The reason for the limitation of the formulation amount to such a range is that the component does not act sufficiently as a catalyst when it is used in an amount of less than 0.01 part by weight and thus it takes a long time for curing. Further, in a deep part of the rubber layer distant from the surface being exposed to air, curing is not sufficiently attain. In the case where the amount exceeds 10 parts by weight, storage stability of the composition becomes poor.

The nitrogen containing silicon compound, (C) to be used in the present invention, is a compound in which a nitrogen atom is bonded to a silicon atom via one or more carbon atoms and the nitrogen atom is also directly bonded to the same silicon atom or another silicon atom. This compound is added to scavenge alcohol released during the process of preparing a mixed composition of (A) and (B) or during sealed storage of the composition and to thus improve storage stability of the composition. (C) is exemplified by N-trimethylsilyl-γ-aminopropyltrimethoxysilane, N-trimethylsilyl-γ-aminopropyltriethoxysilane, N-(N'-trimethylsilyl-β-aminoethyl)aminopropyltrimethoxysilane, 1,1-dimethoxy-2-methyl-1-sila-2-azacyclopentane, 1,1-dimethoxy-2-trimethylsilyl-1-sila-2-azacyclopentane, poly(1,1-dimethoxy-5-trimethylsilyl-1-sila-5-azapentane), etc. Such a compound may be used alone or as a mixture thereof. It is preferred that they are N-trimethylsilyl-γ-aminopropyltriethoxysilane, or 1,1-dimethoxy-2-trimethyl-silyl-1-sila-2-azacyclopentane or poly(1,1-dimethoxy-5-trimethylsilyl-1-sila-5-azapentane) which is a polymer of the latter obtained by ring-opening polymerization.

The suitable amount of such (C) to be added is 0.5 to 10 parts by weight, more preferably 1 to 5 parts by weight, relative to 100 parts by weight of (A). In the case where the amount to be added is less than 0.5 parts by weight, storage stability of the composition is lowered. In the case where (C) is added more than 10 parts by weight, it is wasteful and uneconomical and, further, physical properties and heat resistance of the cured rubber-like elastomer obtained after completion of curing is lowered, and yellowing of the elastomer due to heating becomes notable.

In the present invention, polyorganosiloxane containing substituted or unsubstituted aminoalkyl groups, (D), is used to prevent bleeding of the surface of the cured elastomer composition comprising (A), (B) and (C) and improve physical properties and durability thereof. Moreover, different from the compound containing polyoxyalkylene chains described in the above-mentioned Japanese Provisional Patent Publication No. 60-18544 (1985) (Japanese Patent Application No. 58-125649 (1983)), it does not lower adhesiveness of a resulting composition to certain plastic substrates.

(D) is an aminoalkyl group containing liquid polyorganosiloxane which may contain amounts of residual hydroxyl groups or alkoxy groups bonded to silicon atoms and is represented by the formula:

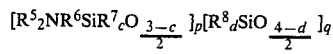

wherein $R^5$, $R^6$, $R^7$, $R^8$, c, d, p and q have the same meanings as defined above.

$R^5$ is exemplified by β-aminoethyl group, γ-aminopropyl group, δ-aminobutyl group, methylaminoethyl group, 2-hydroxy-3-(3-trimethoxysilylpropyloxy)propyl group, etc, in addition to hydrogen atom and groups represented by R in (A)(1). $R^6$ is exemplified by methylene group, ethylene group, trimethylene group, propylene group, tetramethylene group, pentamethylene group, etc. However, due to the facts that the component is chemically stable and not easily subjected to hydrolysis, that a starting intermediate is easily available, and also because of ease of handling, it is preferred that $R^6$ is a propylene group. Thus, preferred substituted or unsubstituted aminoalkyl groups bonded to a silicon atoms of formula $R^5{}_2NR^6$ are γ-aminopropyl group, N-(β-aminoethyl)-γ-aminopropyl group, N-phenyl-γ-aminopropyl group, etc.

$R^7$ is an organic group bonded to a silicon atom contained in the unit of siloxane containing substituted or unsubstituted aminoalkyl groups and $R^8$ is an organic group bonded to a silicon atom contained in the other unit of siloxane, and they are exemplified by the same group as represented by R contained in (A)(1). However, because of ease of synthesis and of the fact that a polysiloxane with a relatively low viscosity is obtained thereby, it is preferred that they are methyl group. In the case where a large amount of substituted or unsubstituted monovalent hydrocarbon groups other than methyl groups are contained, as R, in (A)(1), the above organic group may exist as a part of $R^7$ and/or $R^8$ in view of compatibility with (A)(1). Viscosity of (D) is 5 to 10,000 cP at 25° C., preferably 10 to 2,000 cP. Those with a viscosity of less than 5 cP are volatile, and not reliable in practical use to exhibit the desired effect in a composition. On the other hand, in the case where the viscosity exceeds 10,000 cP, synthesis control is difficult, in addition to the facts that the component is not dispersed well in (A)(1) and exhibits low activity of preventing bleeding on the surface of a resulting cured rubber-like elastomer.

In (D), silicon-functionality of the unit of siloxane containing substituted or unsubstituted aminoalkyl groups may be 1, 2 or 3. In other words, c may be 2, 1 or 0. On the other hand, silicon-functionality of the unit of siloxane containing no such groups as mentioned above may be 1, 2, 3 or 4. Namely, d may be 0 or from 1 to 3, and these siloxane units may exist as a suitable mixture in (D). However, in order to synthesize (D) having a viscosity controlled within the above range, it is preferred that d in (D) is 2 or mixture of 2 and 3. Depending on the method of synthesis, a small amount of residual hydroxyl groups, methoxy groups or ethoxy groups bonded to terminal silicon atoms may remain. If the viscosity of (D) is in the above range, the structure of siloxane may be straight, branched, cyclic or reticulated.

Among the siloxane units constituting (D), at least one unit of siloxane containing substituted or unsubstituted aminoalkyl groups must be present in a molecule, and the amount of such siloxane unit must be 33% or less of the whole siloxane units (namely, $p/(p+q)$ must be 0.33 or less). In the case where the amount exceeds 33%, compatibility of (D) with (A)(1) is lowered, and the component is easily separated which lowers the activity thereof to prevent bleeding of the resulting cured rubber-like elastomer. In the case where the proportion of such siloxane unit is extremely high, it conversely accelerates bleeding on the surface. It is preferred that the amount of the siloxane units is in the range from 0.05 to 20% in order to effectively prevent bleeding.

Such component (D) may be synthesized according to any of the following methods:
(i) To react Si—H bonds contained in a polyorganohydrogensiloxane with an amine having carbon-carbon double bonds in the presence of a platinum series catalyst
(ii) To conduct equilibrium reaction of an alkoxysilane containing substituted or unsubstituted aminoalkyl groups with a polyorganosiloxane
(iii) To conduct cohydrolysis and polycondensation of the above silane with other hydrolytic silane In the present invention, a polyorganosiloxane containing substituted or unsubstituted aminoalkyl groups in (D) is added in an amount of 0.05 to 50 parts by weight, preferably 0.1 to 10 parts by weight relative to 100 parts by weight of (A). In the case where the amount is less than 0.05 part by weight, the effect of preventing bleeding on the surface of a resulting cured substance is not exhibited; whereas in the case where it is used in an excessive amount, it is wasteful and uneconomical, in addition to the fact that the cured substance will be soft and oil bleeds easily.

In the present invention, it is preferred that a fine particulate inorganic filler is added in addition to the above components in order to impart appropriate flowability to a composition prior to curing and high mechanical strength required for a sealing material etc. Such a reinforcing inorganic filler is exemplified by a fumed silica, a calcined silica, a precipitated silica, a fumed titanium oxide and also such filler whose surfaces are treated with an organochlorosilane, a polyorganosiloxane, hexamethyldisilazane, etc., so that they may be hydrophobic, etc. In addition to the above fillers, there may be mentioned calcium carbonate, calcium carbonate surface-treated by an organic acid, diatomaceous earth, ground silica, aluminosilicate, magnesia, alumina, etc. In the case where a composition is required to have especially low modulus as a sealing material for building, it is preferred that, among these fillers, a nonreinforcing filler is used.

In the case where the amount of the above reinforcing inorganic filler is to be added is too small, improved mechanical properties are not sufficiently exhibited. On the other hand, in the case where the amount of the filler is too large, the modulus of the resulting sealant becomes high, and elongation at break becomes small. Accordingly, it is preferred that such a filler is added in an amount selected from the range from 1 to 500 parts by weight, more preferably 5 to 150 parts by weight, relative to 100 parts by weight of (A).

Further, there may possibly be added various kinds of additives such as a pigment, a thixotropic agent, a viscosity controller for improving handling in extruding process, a UV-ray intercepting agent, an antifungal agent, a heat resistance improver, an adhesive improver, a flame retarder, etc.

The present compositions are obtained by mixing all of the compositions mentioned above, optionally in admixture with additives of various kinds, in a condition sealed from moisture.

The thus obtained compositions are used as a room temperature curing polyorganosiloxane composition of so-called one-component type which is stored in a sealed container and does not cure until it is exposed to the moisture contained in air upon use.

The present composition can also be used as a room temperature curing polyorganosiloxane composition of so-called two-component type wherein a pack of components (A), (C) and (D) are stored separated from a pack of component (B) in different containers, and these two packs of components are mixed upon use.

The room temperature curing polyorganosiloxane compositions obtained according to the present invention cure rapidly and have no corrosiveness to copper series metals. In the above compositions, bleeding is prevented on the surface of a resulting cured silicone rubber. Further, the compositions exhibit excellent adhesiveness to various plastic substrates including those of a polycarbonate and acrylic resin and other substrates. Such compositions have very good characteristics as an elastic adhesive or a coating material to be employed in various industries, particularly in electric and electronic industries.

EXAMPLES OF THE INVENTION

The present invention will further be illustrated below by referring to Examples. The present invention is not limited to these Examples. In Examples, part(s) means part(s) by weight and values of physical properties such as viscosity etc. are those measured at 25° C.

In Examples, five kinds of polyorganosiloxane A-1 to A-5 containing a substituted or unsubstituted aminoalkyl group shown below are used. In Comparative Sample 25, polyoxyalkylene modified polyorganosiloxane A-6 shown below was used.

| | |
|---|---|
| A-1 | $[H_2N(CH_2)_3SiO_{3/2}][(CH_3)_2SiO]_{33}$ |
| Terminal group: | ethoxy group |
| Viscosity: | 45 cP |
| A-2 | $[H_2N(CH_2)_2NH(CH_2)_3SiO_{3/2}][(CH_3)_2SiO]_{26}$ |
| Terminal group: | methoxy group |
| Viscosity: | 36 cP |
| A-3 | $(CH_3)_3SiO[CH_3SiO]_5[(CH_3)_2SiO]_{193}Si(CH_3)_3$ |
| | $\quad\quad\quad\quad\quad |$ |
| | $\quad\quad\quad\quad\quad (CH_2)_3NH(CH_2)_2NH_2$ |
| Viscosity: | 420 cP |
| A-4 | $[(CH_3O)_3Si(CH_2)_3OCH_2CHCH_2NH(CH_2)_3SiO_{3/2}][(CH_3)_2SiO]_{40}$ |
| | $\quad\quad\quad\quad\quad\quad\quad |$ |
| | $\quad\quad\quad\quad\quad\quad\quad OH$ |
| Terminal group: | methoxy group |
| Viscosity: | 88 cP |
| A-5 | $(CH_3)_3SiO[CH_3SiO]_3[(CH_3)_2SiO]_{20}[(C_6H_5)_2SiO]_3Si(CH_3)_3$ |
| | $\quad\quad\quad\quad\quad |$ |
| | $\quad\quad\quad\quad\quad (CH_2)_3NH(CH_2)_2NH_2$ |
| Viscosity: | 350 cP |
| A-6 | $(CH_3)_3SiO[(CH_3)_2SiO]_{12}[(CH_3)SiO]_3Si(CH_3)_3$ |
| | $\quad\quad\quad\quad\quad |$ |
| | $\quad\quad\quad\quad\quad (CH_2)_3O[CH_2CHO]_{22}C_4H_9$ |
| | $\quad\quad\quad\quad\quad\quad\quad\quad\quad |$ |
| | $\quad\quad\quad\quad\quad\quad\quad\quad\quad CH_3$ |
| Viscosity: | 330 cP |

EXAMPLE 1

To 100 parts of α-ω-bis(methyldimethoxysilyl)-polydimethylsiloxane with a viscosity of 20,000 cP were added 14 parts of a fumed silica with a specific surface area of 200 m²/g, and the resulting mixture was mixed homogeneously to obtain base compound B-1. On the other hand, 4 parts of methyltrimethoxysilane, 5 parts of γ-aminopropyl-triethoxysilane, 1 part of dibutyl stannous laurate, 7 parts of N-trimethylsilyl-γ-aminopropyltriethoxysilane were mixed together to obtain crosslinking agent mixture C-1.

100 Parts of base compound B-1, 4 parts of crosslinking agent mixture C-1 and 1 part of A-1 were mixed under the condition where moisture is excluded until the mixture became homogeneous, followed by degassing. The mixture was extruded into a sheet with a thickness of 2 mm and the sheet was cured by the moisture contained in air. About 5 minutes later, it was confirmed that the sheet was tack free. After completion of curing, neither bleeding nor cracking was observed on the surface of the cured substance. Another extruded sheet with a thickness of 2 mm of the same composition was left to stand at room temperature for 168 hours, and the physical properties were measured according to JIS K6301, giving the following results: hardness: 28; tensile strength 16 kgf/cm²; elongation: 450%. When the cured substance was immersed in warm water of 50° C. for 48 hours, no particular change was observed.

COMPARATIVE EXAMPLE 1

A composition was prepared by mixing base compound B-1 and crosslinking agent mixture C-1 used in Example 1 following the same manner as in Example 1 except that A-1 was not used, followed by curing similarly as in Example 1 to obtain a rubber-like elastomer. The time until tack free attained by the thus obtained elastomer was 5 minutes. However, the surface of the rubber-like elastomer obtained was bled and resinified to be lustrous, and the physical properties thereof were as follows: hardness: 32; tensile strength: 10 kgf/cm²; and elongation: 230%. Upon observation of the breaking state, it was found that the breaking developed from the portion where cracking had occurred. On the other hand, when the cured substance was immersed in warm water of 50° C. for 48 hours, the color of the surface thereof turned white and the rubber-like elastomer easily dropped off by rubbing with fingers.

EXAMPLE 2

4 Parts of methyl trimethoxysilane, 4.5 parts of 1,3,5-(γ-trimethoxysilylpropyl)isocyanurate, 2 parts of dibutyl stannous dilaurate and 5 parts of 1,1-dimethoxy-2-trimethylsilyl-1-sila-2-azacyclopentane were mixed to obtain crosslinking agent mixture C-2.

To 100 parts of base compound B-1 as used in Example 1 were added 4 parts of crosslinking agent mixture C-2 together with A-1 to A-4 containing each of substituted or unsubstituted aminoalkyl group polyorganosiloxane, as shown in Table 1, according to the same manner as in Example 1, to prepare Samples 21 to 24. Sample 25 of Comparative sample was prepared likewise using polyoxyalkylene chain containing polyorganosiloxane A-6. Experiments were conducted by use of these Samples 21 to 24, Comparative sample 25 and Comparative sample 26 wherein no organically modified polyorganosiloxane was used.

The present Samples and Comparative samples were cured according to the same manner as in Example 1 to obtain rubber-like elastomers. The physical properties of the thus obtained rubber-like elastomers and the state of surface were as shown in Table 1. On the other hand, samples for judging adhesive strength under tension and shear were prepared by use of a polycarbonate as a substrate to be coated according to the method of JIS K 6850. Adhesive strength under tension and shear was measured respectively after the samples were left to stand at room temperature for 168 hours to effect curing. The results are shown in Table 1.

By use of Samples 21 and 23 and Comparative sample 25, adhesive strength under tension and shear to various substrates of acrylic resin, polystyrene, ABS, epoxy resin, aluminum and copper were likewise measured to compare adhesiveness therewith. The results are as shown in Table 2.

TABLE 1

| | Sample No. | | | | Comparative sample | |
|---|---|---|---|---|---|---|
| | 21 | 22 | 23 | 24 | 25 | 26 |
| Kind | A-1 | A-2 | A-3 | A-4 | A-6 | — |
| Amount: part(s) | 1 | 1 | 1 | 1 | 1 | 0 |
| After completion of curing: | | | | | | |
| Hardness (JIS A) | 28 | 28 | 25 | 30 | 31 | 32 |
| Tensile strength (kgf/cm$^2$) | 16 | 17 | 14 | 16 | 14 | 9 |
| Elongation (%) | 470 | 450 | 520 | 490 | 410 | 190 |
| Adhesiveness: (substrate: polycarbonate) | | | | | | |
| Adhesive strength under tension and shear (kgf/cm$^2$) | 10 | 11 | 9 | 10 | not measurable (peeled off prior to experiment) | 7 |
| Cohesive failure (%) | 100 | 100 | 100 | 100 | | 90 |
| State of surface: | | | | | | |
| After leaving to stand for 168 hours | no crack | no crack | no crack | no crack | no crack | crack occurred |
| After immersing in warm water of 50° C. for 48 hours | no change | no change | no change | no change | no change | whitened |

TABLE 2

| | Sample No. | | Comparative sample |
|---|---|---|---|
| | 21 | 23 | 25 |
| Acrylic resin: | | | |
| Adhesion strength under tension and shear (kgf/cm$^2$) | 8 | 9 | 3 |
| Cohesive failure (%) | 100 | 100 | 50 |
| Polystyrene: | | | |
| Adhesion strength under tension and shear (kgf/cm$^2$) | 8 | 9 | 6 |
| Cohesive failure (%) | 100 | 100 | 80 |
| ABS resin: | | | |
| Adhesion strength under tension and shear (kgf/cm$^2$) | 8 | 10 | 12 |
| Cohesive failure (%) | 100 | 100 | 100 |
| Epoxy resin: | | | |
| Adhesion strength under tension and shear (kgf/cm$^2$) | 9 | 8 | 10 |
| Cohesive failure (%) | 100 | 100 | 100 |
| Aluminum: | | | |
| Adhesion strength under tension and shear (kgf/cm$^2$) | | 9 | 11 |
| Cohesive failure (%) | 100 | 100 | 100 |
| Copper: | | | |
| Adhesion strength under tension and shear (kgf/cm$^2$) | 12 | 10 | 9 |
| Cohesive failure (%) | 100 | 100 | 100 |

EXAMPLE 3

To 100 parts of α,β-bis(trimethoxysilyl)polydimethylsiloxane with a viscosity of 10,000 cP were added 14 parts of fumed silica with a specific surface area of 200 m$^2$/g, and the resulting mixture was mixed homogeneously to obtain base compound B-2. On the other hand, 4 parts of tetramethoxysilane, 2 parts of N-(β-aminoethylaminopropyl)trimethoxysilane, 1 part of an equimolar reactant of γ-aminopropyl triethoxysilane and γ-glycidoxypropyl trimethoxysilane, 1.5 parts of dibutyltin-dilaurate, 5 parts of a mixture of 1,1-dimethyloxy-2-trimethylsilyl-1-sila-2-azacyclopentane and a ring-opening polymer thereof were mixed together to obtain mixed crosslinking agent C-3.

To 100 parts of base compound B-2 were added 4.5 parts of crosslinking agent mixture C-3 and 1 part of aminoalkyl group containing polyorganosiloxane A-1 in the same manner as in Example 1 to prepare a composition.

When the thus obtained composition was cured in the same manner as in Example 1, it showed a tack free state after 5 minutes. After completion of curing, there was observed neither bleeding nor cracking on the surface of the cured substance. When the substance was immersed in warm water of 50° C. for 48 hours, no change was observed, and the physical properties thereof were as follows: hardness: 30; tensile strength: 16 kgf/cm$^2$; and elongation: 320%. Samples for measuring adhesive strength under tension and shear was prepared from the composition using a polycarbonate as a substance to be coated according to the method of JIS K 6850. Adhesion strength under tension and shear to a polycarbonate substrate was 9 kgf/cm$^2$ (cohesive failure: 100%).

EXAMPLE 4

To 100 parts of polydiorganosiloxane having a viscosity of 20,000 cP comprising units of 11 mole % of diphenylsiloxane and the residual mole % of dimethylsiloxane, end-blocked by methyldimethoxysilyl were added 15 parts of fumed silica with a specific surface area of 200 m$^2$/g, and the resulting mixture was mixed homogeneously to obtain base compound B-3. To 100 parts by weight of the thus obtained base compound B-3 were added 5.5 parts of crosslinking agent mixture C-2 used in Example 2 and 1 part of a polyorganosiloxane containing N-(β-aminoethyl)-γ-aminopropyl groups A-5 according to the same manner as in Example 1 to obtain a composition.

When the thus obtained composition was cured according to the same manner as in Example 1, it was tack free 8 minutes later. After completion of curing, there was observed neither bleeding nor cracking on the surface of the cured substance. When the cured substance was immersed in warm water of 50° C. for 48 hours, no change was observed, and the physical properties thereof were as follows: hardness: 34; tensile strength: 14 kgf/cm$^2$; elongation: 280%. Adhesion strength under tension and shear to a polycarbonate substrate was 8 kgf/cm$^2$ cohesive failure 100%).

We claim:
1. Room temperature curing polyorganosiloxane compositions comprising:
(A) 100 parts by weight of a composition containing

(1) a polyorganosiloxane of the formula:

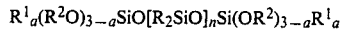

wherein R and $R^1$ may be the same or different and each represents a substituted or unsubstituted monovalent hydrocarbon group; $R^2$ represents a monovalent group selected from the group consisting of an alkyl group having 1 to 4 carbon atoms and an alkoxyalkyl group having 1 to 6 carbon atoms in total; a is a numeral of 0 or 1; and n is a numeral, by which the viscosity of (A) at 25° C. is 100 to 500,000 cP,
which is reactive at the terminal groups and
(2) a silane of the formula:

wherein $R^3$ represents a substituted or unsubstituted monovalent hydrocarbon group; $R^4$ represents a monovalent group selected from the group consisting of an alkyl group having 1 to 4 carbon atoms and an alkoxyalkyl group having 1 to 6 carbon atoms in total; b is a numeral of 0 or 1;
or a hydrolyzate thereof,
wherein (A)(1) is 85 to 100% by weight of the total of (A)(1) and (A)(2);
(B) 0.01 to 10 parts by weight of a curing catalyst;
(C) 0.5 to 10 parts by weight of a nitrogen containing silicon compound, wherein a nitrogen atom is bonded to a silicon atom via one or more carbon atoms and the nitrogen atom is also bonded directly to the same silicon atom or another silicon atom; and
(D) 0.05 to 50 parts by weight of a polyorganosiloxane containing substituted or unsubstituted aminoalkyl groups, and expressed by the formula:

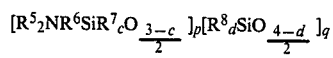

wherein $R^5$ is the same or different and each represents a monovalent group selected from the group consisting of a hydrogen atom, and substituted or unsubstituted hydrocarbon groups; $R^6$ represents a divalent hydrocarbon group; $R^7$ and $R^8$ is the same or different and each represents a substituted or unsubstituted monovalent hydrocarbon group; c is a numeral of 0, 1 or 2; d is a numeral of 0 or from 1 to 3; and p and q are numerals of 1 or more, by which the viscosity of (D) at 25° C. is 5 to 10,000 cP and $p/(p+q)$ is 0.33 or less.

2. Compositions according to claim 1 wherein the terminal group of (A)(1) is a methyldimethoxysilyl group.

3. Compositions according to claim 2, wherein (A)(1) is a polydimethylsiloxane end-blocked by methyldimethoxysilyl groups.

4. Compositions according to claim 1, wherein the viscosity of (A)(1) at 25° C. is 500 to 200,000 cP.

5. Compositions according to claim 2, wherein the viscosity of (A)(1) at 25° C. is 500 to 200,000 cP.

6. Compositions according to claim 3, wherein the viscosity of (A)(1) at 25° C. is 500 to 200,000 cP.

7. Compositions according to claim 1, wherein $R^4$ in (A)(2) is a methyl group.

8. Compositions according to claim 2, wherein $R^4$ in (A)(2) is a methyl group.

9. Compositions according to claim 3, wherein $R^4$ in (A)(2) is a methyl group.

10. Compositions according to claim 7, wherein (A)(2) is tetramethoxysilane.

11. Compositions according to claim 7, wherein (A)(2) is methyltrimethoxysilane.

12. Compositions according to claim 1, wherein the amount of (A)(2) is from 0.4 to 5% by weight to (A).

13. Compositions according to claim 1, wherein (B) is an organic stannous compound.

14. Compositions according to claim 1, wherein the amount of (B) to be added is 0.1 to 1 part by weight.

15. Compositions according to claim 1, wherein (C) is N-trimethylsilyl-γ-aminopropyl triethoxysilane.

16. Compositions according to claim 1, wherein (C) is 1,1-dimethoxy-2-trimethylsilyl-1-sila-2-azacyclopentane.

17. Compositions according to claim 1, wherein (C) is poly(1,1-dimethoxy-5-trimethylsilyl-1-sila-5-azapentane).

18. Compositions according to claim 1, wherein the amount of (C) to be added is 1 to 5 parts by weight.

19. Compositions according to claim 1, wherein $R^5{}_2NR^6$ in (D) is a γ-aminopropyl group.

20. Compositions according to claim 1, wherein $R^5{}_2NR^6$ in (D) is a N-(β-aminoethyl)-γ-aminopropyl group.

21. Compositions according to claim 1, wherein $R^7$ in (D) is a methyl group.

22. Compositions according to claim 1, wherein $R^8$ in (D) is a methyl group.

23. Compositions according to claim 1, wherein $p/(p+q)$ is 0.005 to 0.2.

24. Compositions according to claim 1, wherein the viscosity of (D) at 25° C. is 10 to 2,000 cP.

25. Compositions according to claim 1, wherein d in (D) is 2 or mixture of 2 and 3.

26. Compositions according to claim 1, wherein the amount of (D) to be added is 0.1 to 10 parts by weight.

* * * * *